United States Patent [19]

Browder et al.

[11] 4,027,171

[45] May 31, 1977

[54] POWER DEMAND LIMITING SYSTEM

[75] Inventors: Joe B. Browder, Atlanta; R. Courtenay Bythewood, Lithonia; Walter R. Hensley, Stone Mountain, all of Ga.

[73] Assignees: Joe B. Browder, Atlanta; Walter R. Hensley, Stone Mountain, both of Ga.

[22] Filed: Aug. 13, 1975

[21] Appl. No.: 604,440

[52] U.S. Cl. .............................. 307/39; 236/46 R; 62/231; 307/117

[51] Int. Cl.² ........................................ H02J 13/00

[58] Field of Search ............... 62/231, 158; 236/46, 236/46 R; 219/485, 492; 307/117, 116, 39

[56] References Cited

UNITED STATES PATENTS

| | | | |
|---|---|---|---|
| 3,261,992 | 7/1966 | Coe | 307/117 |
| 3,306,348 | 2/1967 | Tucker | 62/158 X |
| 3,444,391 | 5/1969 | Smith | 62/158 X |
| 3,551,646 | 12/1970 | Harmon | 219/485 |
| 3,599,006 | 10/1971 | Harris | 62/158 X |
| 3,714,453 | 1/1973 | Delisle et al. | 307/39 |
| 3,817,052 | 6/1974 | Connelly et al. | 62/158 |
| 3,925,680 | 12/1975 | Dixon | 307/39 |

Primary Examiner—Robert K. Schaefer
Assistant Examiner—Morris Ginsburg
Attorney, Agent, or Firm—Newton, Hopkins & Ormsby

[57] ABSTRACT

A power demand limiting system is disclosed for limiting peak power demand of space conditioning loads adapted to be coupled with an electric utility power supply by space temperature responsive switching means. The system includes timer means for cyclically coupling and uncoupling the space conditioning load with the electric utility power supply through the space temperature responsive switching means, and timer control means for selectively energizing and deenergizing the timer means.

29 Claims, 3 Drawing Figures

POWER DEMAND LIMITING SYSTEM

BACKGROUND OF THE INVENTION

Electrical utilities today must have far more capacity for supplying communities and municipalities with power than that normally required. This costly, excessive capacity is needed in order to handle intermittent peak power demands created largely today by space conditioning loads such as air conditioners and electric heaters. Heretofore, electric utilities have only been able to shave these demand peaks by denying service to selected groups of customers for extended periods of time ranging from several hours to several days. To deny any customer electrical power for such periods is, of course, to provide quite a disservice.

Accordingly, it is a general object of the present invention to provide improved means for limiting peak power demands of consumers upon electrical utilities.

More specifically, it is an object of the present invention to provide power demand limiting systems for limiting peak power demand of space conditioning loads such as air conditioning and electrical heating systems.

Another object of the invention is to provide power demand limiting systems of the type described which may be automatically energized and deenergized as conditions effecting demand dictate.

Another object of the invention is to provide power demand limiting systems for limiting peak power demand of space conditioning loads of power consumers that may be energized and deenergized by electrical utilities from locations remote from the space conditioning loads.

Yet another object of the invention is to provide power demand limiting systems of the type described which may be easily incorporated into preconstructed space conditioning load control circuits.

SUMMARY OF THE INVENTION

In one form of the invention, a power demand limiting system is provided for limiting peak power demand of a space conditioning load adapted to be coupled with an electric utility power supply through space temperature responsive switching means. The system includes timer means for cyclically coupling and uncoupling the space conditioning load with the electric utility power supply through the space temperature responsive switching means, and timer control means for selectively energizing and deenergizing the timer means.

In another form of the invention, a power demand limiting system is provided for limiting peak power demand of a space conditioning load adapted to control the temperature of a designated space. Here, the system comprises a first thermostatic switch operatively responsive to the temperature of air within the designated space in series circuit with a second thermostatic switch operatively responsive to the temperature of ambient air outside the designated space.

In yet another form of the invention, a power demand limiting system is provided for limiting peak power demand of a space conditioning load. The system includes circuit means for alternatively coupling the space conditioning load with an electric utility power supply through a thermostatic switch operatively responsive to the temperature of air within the conditioned space, and through both the thermostatic switch and a time cycling switch that includes an actuator driven by a motor coupled with the electric utility power supply through the thermostatic switch.

In still another form of the invention, a power demand limiting system is provided for limiting peak power demand of a space conditioning load energizing means coupled with a source of electric power serially through a thermostatic switch operatively responsive to the temperature of the conditioned space, a double throw switch controlled by switch activating means, and a time cycling switch. The switch activating means may include an ambient temperature sensing device or a device that receives signals generated by the utility through conventional radiowave, microwave or transmission line ripple sensing means.

DESCRIPTION OF THE PREFERRED EMBODIMENTS

Figure 1:
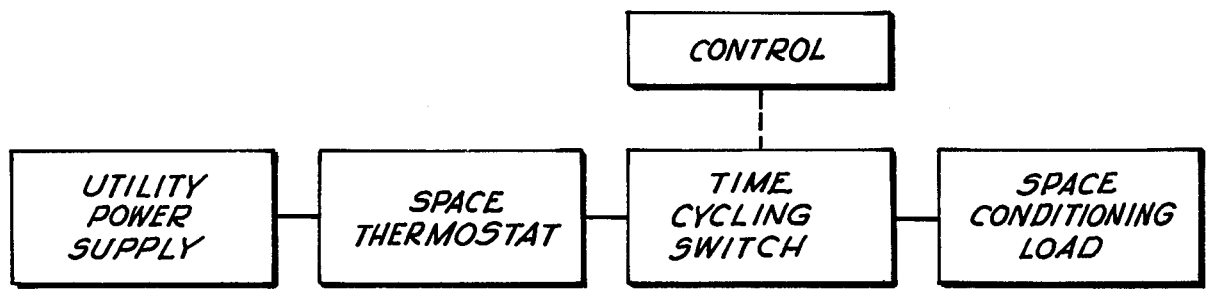
FIG. 1 is a block diagram of a power demand limiting system embodying general principles of the present invention.

In FIG. 1 a space conditioning load is seen to be coupled with an electric utility power supply through a conventional space thermostat and also through a time cycling switch. In this manner, activation of the thermostat serves to energize the space conditioning load only periodically in view of the presence of the time cycling switch. This system therefore serves to prevent the space conditioning load from continuously demanding power from the electric utility power supply. With such limiting systems incorporated into hundreds or thousands of consumers' space conditioning load control circuits, their aggregate peak demand on the utility power supply is substantially reduced so long, of course, as the multitude of time cycling switches are not synchronized.

Figure 2:
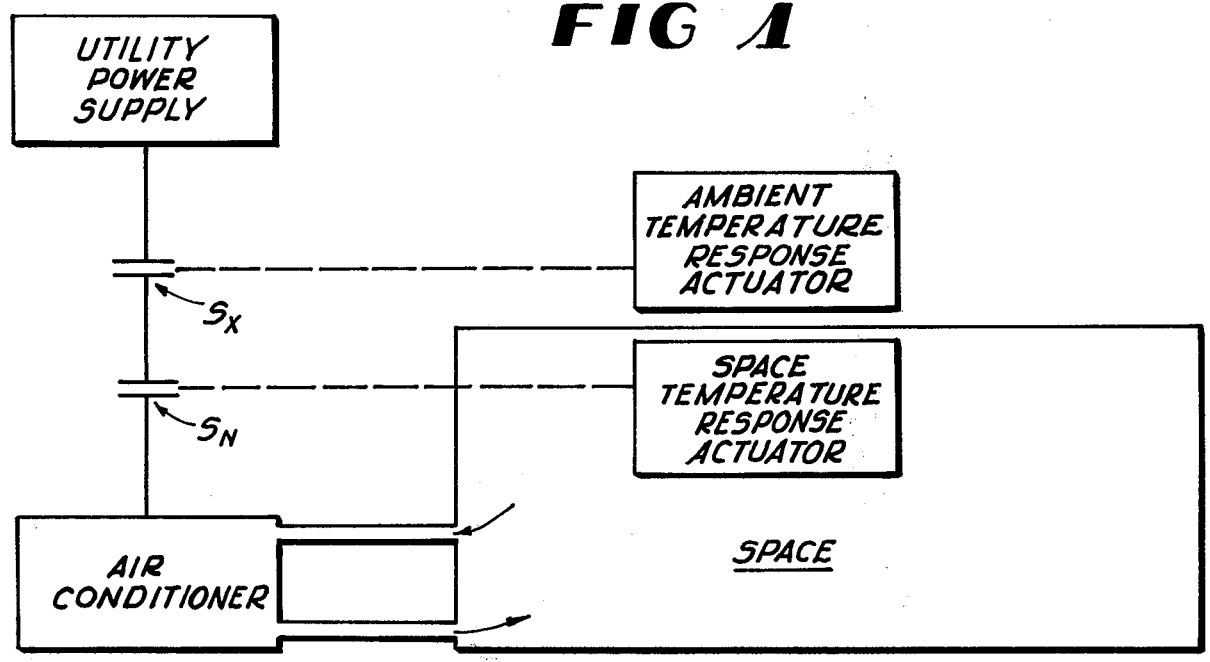
FIG. 2 is a block diagram in more detail of a power demand limiting system embodying principles of the invention.

In FIG. 2, a power demand limiting system embodying principles of the invention is shown for limiting peak power demand of an air conditioner adapted to cool air within a selected space generally insulated from ambient air. The air conditioner is seen to be conventionally coupled with an electric utility power supply through a thermostatic switch Sn controlled by a space temperature responsive actuator sensitive to the temperature of air within the conditioned space. However, here it will again be seen that the air conditioner is also controlled by a time cycling switch Sx which is periodically placed operatively into the air conditioner control circuit by an ambient temperature responsive actuator.

The ambient temperature responsive actuator may take the form of a conventional thermostat mounted outside the house as in a meter box or on a utility pole. In this manner, once ambient temperature becomes quite elevated, as on a hot summer afternoon, the exterior thermostat places the time cycling switch Sx on line, limiting the duty cycle of the air conditioner. since the precise time at which the exterior thermostat actuates the timer will vary from one customer, or group of customers proximate one another to another, the time cycling switches of all customers of the electric utility will not be synchronized. Thus, at any one time, some of the customers' switches Sx will be closed, thereby energizing their air conditioners, while others will be opened deenergizing their units. This causes the aggregate demand placed upon the utility to be vastly diminished. With relatively short switch cycle times, such as 15 to 30 minutes, the discomfort occasioned by periodic, short-term loss of air conditioning or heating can be rendered quite tolerable for most customers.

Figure 3:
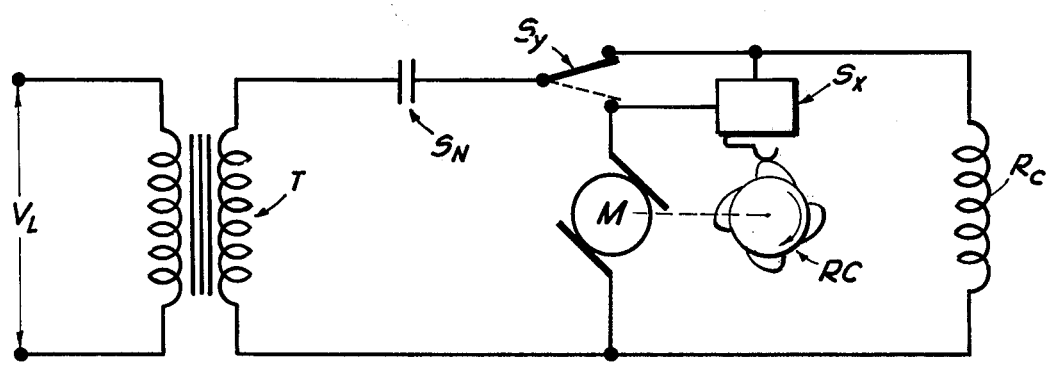
FIG. 3 is a circuit diagram illustrating other principles of the invention in a preferred form.

In FIGS. 1 and 2 the system is shown in highly schematic form for clarity. Thus, no distinction is here made between the load control and load power supply circuits. In FIG. 3, however, an actual control circuit is diagrammed in detail which may be used in practicing the invention. Here, an air conditioner energizing coil Rc is seen to be connected across the secondary coil of a step down transformer T having its primary winding coupled with line voltage serially through a conventional thermostatic switch Sn controlled by the temperature of air within the conditioned space and a double throw switch Sy. With switch Sy in the position illustrated by the solid line, power to the load energizing coil Rc is controlled solely by the conventional indoor thermostatic switch Sn with switch Sy thrown to the other position here illustrated in broken lines, motor M is energized to drive a cam RC which cyclically operates a microswitch Sx whereby energy to coil Rc is supplied seraily through switches Sn, Sy and Sx. For relay Rc to be then energized, not only must the conventional or "indoor" thermostat be positioned on, but the time cycling switch Sy must also be momentarilly in an "on" position. The double throw switch Sy may be controlled by an exterior thermostat as shown in FIG. 2, or it may be alternatively operated directly by the utility through conventional radiowave, microwave or transmission line ripple signals. For these alternatives, switch Sy is, of course, directly controlled by an appropriate radio received or ripple sensor.

An example of such radio controlled device is the "Peak Load Deferral System", Model 800W, manufactured by Motorola, Inc. The ripple sensor equipment can be obtained from Landis and Gyr of New York and Zellweger-Uster Ltd. of Charlotte, N.C.; both companies call their equipment the "Load Management System".

If an ambient temperature response actuator is utilized in the present invention, the actuator should be located remote from any temperature generator, such as the heat generated by homes with poor attic ventilation and poor wall construction. That additional heat, plus the heat from motor M, can give the actuator a false temperature reading.

It should be understood that the above described embodiments merely illustrate principles of the invention in preferred forms. Many modifications, additions or deletions may, of course, be made thereto without departure from the spirit and scope of the invention as set forth in the concluding claims. It should also be understood that space conditioning loads and their energizing devices, such as coil Rc, for example, are herein used interchangeably since any decision as to utilization of the load control circuitry and its associated voltage level itself or undependent power and control circuits is merely a matter of design choice predicated essentially on load power requirements.

What is claimed is:

1. A power demand limiting system for limiting peak power demand of a space conditioning load adapted to be coupled with an electric utility power supply through space temperature responsive switching means comprising, in combination, timer means for cyclically coupling and uncoupling the space conditioning load with said electric utility power supply through the space temperature responsive switching means, and timer control means for selectively energizing and deenergizing said timer means.

2. A power demand limiting system in accordance with claim 1 wherein said timer control means comprises a thermostat.

3. A power demand limiting system in accordance with claim 1 wherein said timer control means comprises radio receiver means.

4. A power demand limiting system in accordance with claim 1 wherein said timer control means comprises power transmission line ripple sensing means.

5. A power demand limiting system for limiting peak power demand of a space conditioning load adapted to control the temperature of a designated space comprising a first thermostatic switch operatively responsive to the temperature of air within the designated space in series circuit with a second thermostatic switch operatively responsive to the temperature of air outside the designated space.

6. A power demand limiting system in accordance with claim 5 wherein said first and second thermostatic switches are in series circuit with an air conditioning system energizing relay coil.

7. A power demand limiting system for limiting peak power demand of a space conditioning load comprising circuit means for alternatively coupling the space conditioning load with an electric utility power supply through a thermostatic switch operatively responsive to the temperature of air within the conditioned space, and through both said thermostatic switch and a time cycling swtich that includes an actuator driven by a motor coupled with the electric utility power supply through said thermostatic switch.

8. A power demand limiting system accordance with claim 7 wherein said circuit means includes a double throw switch in series circuit with said thermostatic switch.

9. A power demand limiting system in accordance with claim 8 further comprising means responsive to the temperature of air without the conditioned space for actuating said double throw switch.

10. A power demand limiting system for limiting peak power demand of a space conditioning load comprising, in combination, space conditioning load energizing means coupled with a source of electric power serailly through a thermostatic switch operatively responsive to the temperature of the conditioned space, a double throw controlled by switch actuating means, and a time cycling switch.

11. A power demand limiting system in accordance with claim 10 further comprising conductor means connected with said double throw switch across said time cycling switch.

12. A power demand limiting system in accordance with claim 10 wherein said time cycling switch includes a motor adapted to be coupled with said source of electric power serially through said thermostatic switch and said double throw switch.

13. A power demand limiting system in accordance with claim 10 wherein said switch actuating means includes a second thermostatic switch operatively responsive to the temperature of ambient air external to the conditioned space.

14. A power demand limiting system in accordance with claim 10 wherein said switch actuating means includes a radio wave receiver.

15. A power demand limiting system in accordance with claim 10 wherein said switch actuating means includes a power transmission line ripple sensor.

16. A method of limiting power demand of a space conditioning load adapted to be coupled with an electric utility power supply by the positioning of a space temperature sensitive thermostatic switch in an on position, said method comprising the steps of coupling the space conditioning load continuously with the electric utility power supply when the thermostatic switch is in the on position during periods of relatively low power demand, and coupling the space conditioning load intermittently with the electric utility power supply when the thermostatic switch is in the on position during periods of relatively high power demand.

17. A method of limiting power demand in accordance with claim 16 wherein the periods of relatively high power demand and the periods of relatively low power demand are differentiated by sensing the temperature of ambient air external the space.

18. A method of limiting power demand in accordance with claim 16 wherein the periods of relatively high power demand and the periods of relatively low power demand are differentiated by power transmission line ripple signals.

19. A method of limiting power demand in accordance with claim 16 wherein the periods of relatively high power demand and the periods of relatively low power demand are differentiated by radiowave signals.

20. A method of limiting power demand of a space conditioning load comprising the steps of coupling the space conditioning load with an electric utility power supply through thermostatic switch means responsive to the temperature of air within the space during a first set of time spaced intervals, and coupling the space conditioning load with the electric utility power supply through the thermostatic switch and through a time cycling switch during a second set of time intervals time spaced by the first set of intervals.

21. A method of limiting power demand in accordance with claim 20 wherein the first and second sets of time intervals are differentiated by sensing the temperature of ambient air external the space.

22. A method of limiting power demand in accordance with claim 20 wherein the first and second sets of time intervals are differentiated by power transmission line ripple signals.

23. A method of limiting power demand in accordance with claim 20 wherein the first and second sets the time intervals are differentiated by radio signals.

24. A method of limiting power demand of a plurality of space conditioning loads adapted to be coupled with an electric utility power supply comprising the step of interposing a space temperature responsive switching means including a timer means and timer control means for selectively energizing and deenergizing said timer means between each of said loads and said power supply during periods of relatively high power demand to provide the unsynchronous, cyclical coupling and uncoupling of said loads with said supply.

25. A method of limiting power demand in accordance with claim 24 wherein said timer control means comprises a thermostat.

26. A power demand limiting system for limiting peak power demand of a plurality of space conditioning loads adapted to be coupled with an electric utility power supply through space temperature responsive switching means comprising, are in combination, timer means for cyclically coupling and uncoupling each of said loads with said power supply through said switching means, and timer control means for the selective, unsynchronous energizing and deenergizing of each of said timer means.

27. A power demand limiting system in accordance with claim 26 wherein said timer control means comprises a thermostat.

28. A method of limiting the peak electrical power demand of a residential user having an air conditioning unit connected in an electrical power supply, comprising the steps of monitoring the temperature of the ambient air outside the residence and the temperature inside the residence and in response to both the outside monitored temperature exceeding a first preselected value and the temperature inside the residence exceeding a second preselected value, cyclically coupling and uncoupling the air conditioning unit with the electrical power supply on a timed, repetitive basis until the temperature of the ambient air outside the residence drops below the preselected value.

29. The method of limiting peak electrical power cumulatively demanded by the air conditioning units associated with a plurality of consumer spaces serviced in common by an electrical power network, which comprises the steps of:
a. sensing the ambient temperatures associated with the locations of groups of said consumer spaces;
b. cyclically disconnecting the air conditioning units of those groups of consumer spaces with which the temperatures sensed in step (a) exceed a predetermined value; and
c. asynchronously controlling the cyclings of step (b) whereby the aggregate demand placed upon the electrical power network is materially reduced while still maintaining the temperatures within said consumer spaces at a tolerable level.

* * * * *